US012186750B2

(12) United States Patent
Pompano et al.

(10) Patent No.: US 12,186,750 B2
(45) Date of Patent: Jan. 7, 2025

(54) SLIPCHIP DEVICE FOR ON-CHIP DILUTION AND SIZE-BASED EXTRACTION OF PROTEIN LABELING REAGENTS

(71) Applicant: University of Virginia Patent Foundation, Charlottesville, VA (US)

(72) Inventors: Rebecca Rose Pompano, Charlottesville, VA (US); Andrew Kinman, Franklin, IN (US)

(73) Assignee: University of Virginia Patent Foundation, Charlottesville, VA (US)

( * ) Notice: Subject to any disclaimer, the term of this patent is extended or adjusted under 35 U.S.C. 154(b) by 555 days.

(21) Appl. No.: 16/975,017

(22) PCT Filed: Feb. 25, 2019

(86) PCT No.: PCT/US2019/019406
§ 371 (c)(1),
(2) Date: Aug. 21, 2020

(87) PCT Pub. No.: WO2019/165363
PCT Pub. Date: Aug. 29, 2019

(65) Prior Publication Data

US 2021/0031187 A1 Feb. 4, 2021

Related U.S. Application Data

(60) Provisional application No. 62/634,565, filed on Feb. 23, 2018.

(51) Int. Cl.
*B01L 3/00* (2006.01)

(52) U.S. Cl.
CPC ..... *B01L 3/50273* (2013.01); *B01L 2200/025* (2013.01); *B01L 2300/045* (2013.01); (Continued)

(58) Field of Classification Search
None
See application file for complete search history.

(56) References Cited

U.S. PATENT DOCUMENTS

| | | | | |
|---|---|---|---|---|
| 9,415,392 | B2 * | 8/2016 | Ismagilov | B01F 33/304 |
| 9,447,461 | B2 | 9/2016 | Ismagilov et al. | |

(Continued)

FOREIGN PATENT DOCUMENTS

| | | |
|---|---|---|
| WO | WO 2010/111265 | 9/2010 |

OTHER PUBLICATIONS

Birch et al. (2017) Rapid Fabrication of Electrophoretic Microfluidic Devices from Polyester, Adhesives and Gold Leaf. Micromachines 8:17.

(Continued)

*Primary Examiner* — Matthew D Krcha
(74) *Attorney, Agent, or Firm* — Jenkins, Taylor & Hunt, P.A

(57) ABSTRACT

Provided are devices for carrying out reactions, which in some embodiments can include a plurality of first, second, third, and fourth reservoirs disposed on first and second surfaces, wherein the first and second surfaces are configured to move relative in to each other between first, second, third, fourth, and fifth positions to expose the first, second, third, and fourth reservoirs to each other or isolate the first, second, third, and fourth reservoirs from each other, as desired. In some embodiments, the devices include one or more detection windows that are substantially transparent to light in the ultraviolet (UV)/visible spectrum to allow assaying the extent to which a reaction has proceeded and/or to determine an optimal degree thereof. Also provided are methods for using the disclosed devices for performing reactions including but not limited to conjugation reactions as well as to optimize the same.

20 Claims, 8 Drawing Sheets

(52) U.S. Cl.
CPC . *B01L 2300/047* (2013.01); *B01L 2300/0681* (2013.01); *B01L 2300/0816* (2013.01); *B01L 2300/087* (2013.01); *B01L 2400/0475* (2013.01)

(56) References Cited

U.S. PATENT DOCUMENTS 9,464,319 B2 10/2016 Ismagilov et al.
2012/0028342 A1* 2/2012 Ismagilov .............. G01N 21/78
422/503

OTHER PUBLICATIONS

Chang et al. (2015) Polydimethylsiloxane SIipChip for mammalian cell culture applications. Analyst 140:7355-7365
International Search Report for PCT/US2019/019406 dated May 10, 2019.
Written Opinion of the International searching Authority for PCT/US2019/019406 dated May 10, 2019.

* cited by examiner

SLIPCHIP DEVICE FOR ON-CHIP DILUTION AND SIZE-BASED EXTRACTION OF PROTEIN LABELING REAGENTS

CROSS-REFERENCE TO RELATED APPLICATION

This application claims the benefit of U.S. Provisional Patent Application Ser. No. 62/634,565, filed Feb. 23, 2018, the disclosure of which is incorporated herein by reference in its entirety.

TECHNICAL FIELD

The presently disclosed subject matter relates to devices for carrying out reactions and methods for using the same. In some embodiments, the devices comprise two surfaces, each comprising a plurality of reservoirs, wherein the reservoirs provide locations for various reactants to be maintained and for the steps of the reactions to take place. The two surfaces are translatable with respect to each other such that individual members of the plurality of reservoirs can be made to come into contact with each other such that the reactants maintained therein can interact with each other. Other locations on the surfaces can be employed for purifying the products of the reactions from the unreacted reactants and/or for assaying the products of the reactions such as by employing a plate reader.

BACKGROUND

Protein conjugation is a wide class of chemical reactions, in a protein of interest is chemically linked to one or more functional groups, such as a fluorophore, chromophore, a chemical affinity reagent such as biotin, a nucleic acid, another protein or peptide, or a drug. Conjugation is a big business; a number of biochemical companies sell specialized reagents to researchers to facilitate conjugation, including most notably Thermo Fisher Scientific Inc. (Waltham, Mass., United States of America), particularly its Thermo Scientific Pierce Protein Biology and Life Technologies subsidiaries, in addition to many smaller companies. Furthermore, antibody-drug conjugates are in growing numbers of clinical trials for diseases such as cancer and autoimmunity (Tsuchikama, 2018).

Typically, the functional group of interest is linked to a chemically reactive group that binds to the protein. Binding can occur via a sidechain (e.g., a succinidmidyl ester-linked dye will react with free amines on lysines and the N-terminus of the protein), or via a site-selective linkage that has been integrated into the protein beforehand (e.g., through genetic modification, or through reduction to expose free sulfhydryl groups; Stephanopoulos & Francis, 2011; Spicer & Davis, 2014).

In many cases, the mole ratio of the functional group to the protein is a critical parameter for subsequent use of the labelled protein. The exact desired ratio depends on the application. For example, when adding a fluorophore to an antibody, it is typically desirable to add 3-5 fluorophores per antibody. Too few fluorophores can be difficult to detect in downstream imaging or fluorometric applications, while too many can obstruct the binding regions of the protein and impair its function. Similarly, for number of drug molecules per antibody has a significant effect on the efficacy of an antibody-drug conjugate (Tsuchikama, 2018).

When tight control over the ratio of functional group to protein is needed, there is no way to predict a priori the optimal mol ratio of reagents to input into the reaction. The functional group is typically added in excess of the protein in order to accelerate the reaction; 1- to 20-fold excess is a common range. Optimization is conducted by trial-and-error, varying the mole ratio of the two reagents in reactions that typically consume a minimum of 10 μL of protein stock solution (10 μg) each. This process is time consuming and wasteful of precious protein. A simple, rapid analysis of protein labeling is needed to conserve time and reagents, and optimized reagent ratios should be directly scalable for lab use.

As disclosed herein, a type of microfluidic device called a SlipChip offers a unique solution to these issues by providing a hand-operated platform that requires no specialized equipment or training to operate. A SlipChip is a two-phase microfluidic device, typically with two opposing plates (i.e. top and bottom) containing aqueous droplets in their channels and wells (Du et al., 2009). A thin oil layer is typically sandwiched between the two plates to prevent leakage while the movement of the plates relative to one another provides on-demand rearrangement of fluidic pathways. The SlipChip was originally invented by Rustem Ismagilov (see e.g., U.S. Pat. Nos. 9,415,392; 9,447,461; 9,464,319; 9,493,826; 10,196,700, all to Ismagilov et al., herein incorporated by reference in their entireties; PCT International Patent Application Publication No. WO 2010/111265, of Ismagilov et al., herein incorporated by reference in its entirety), and has been commercialized by a spin-out company, Talis Corporation (Menlo Park, Calif., United States of America), primarily for applications in molecular biology (e.g., nucleic acid quantification). In the research literature, SlipChips have been used to perform chemical assays, PCR, and culture of both bacterial and mammalian cells (Li & Ismagilov, 2010; Li et al., 2010; Liang et al., 2014; Chang et al., 2015), but not for the purpose of optimizing a chemical reaction as described herein.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter provides devices for carrying out reactions, including but not limited to reactions in which proteins such as antibodies or fragments thereof are labeled with detectable agents. In some embodiments, the devices comprise a first part having a first surface and a second part having a second surface opposed to the first surface; a plurality of first reservoirs located along a portion of the first surface, each of the plurality of first reservoirs configured to maintain at least one first substance; a plurality of second reservoirs located along a portion of the second surface, each of the plurality of second reservoirs configured to maintain at least one second substance; a plurality of third reservoirs located along a portion of the second surface, each of the plurality of third reservoirs configured to maintain at least one third substance; and a plurality of fourth reservoirs located along a portion of the first surface, each of the plurality of fourth reservoirs configured to maintain at least one fourth substance, optionally wherein one or more, optionally each, of the plurality of fourth reservoirs is separated into two, three, four, five, six, or more sub-reservoirs; wherein the first surface and the second surface are configured to move relative to each other between a first position in which the plurality of first, second, third, and fourth reservoirs are not exposed to any of the other first, second, third, or fourth reservoirs; a second position in which at least one of the plurality of first reservoirs is exposed to at least one of the plurality of the second reservoirs and none of the third or fourth reservoirs; a third position in which at least one of the plurality of first reservoirs is exposed to at least one of the plurality of the third reservoirs and none of the second or fourth reservoirs; a fourth position in which at least one of the plurality of first reservoirs is exposed to at least one of the plurality of the fourth reservoirs and none of the second or third reservoirs; and a fifth position in which the plurality of first, second, third, and fourth reservoirs are not exposed to any of the other first, second, third, or fourth reservoirs, and wherein the first part and the second part are engaged with each other before and after the relative motion.

In some embodiments, the plurality of first reservoirs are configured to maintain the same volume of the at least one first substance as each other.

In some embodiments, the first substance is a detectable agent, such as but not limited to a detectable dye.

In some embodiments, the plurality of second reservoirs are configured to maintain different volumes of the at least one second substance as each other.

In some embodiments, the second substance is a dilution buffer, and the second reservoirs accomplish different dilutions of the first substances when the first reservoirs are moved to allow the first substances and the second substances to mix.

In some embodiments, the plurality of third reservoirs are configured to maintain the same volume of the at least one third substance as each other.

In some embodiments, the third substances comprise a target ligand to which the first substances are to conjugated. As such, in some embodiments the third substances are present in a buffer than permits the conjugation reaction to proceed and/or when the first reservoirs are moved to allow the first substances mixed with the second substances to mix with the third substances, the mixing produces such a buffer.

In some embodiments, the plurality of first reservoirs are configured to maintain different volumes of the at least one first substance as each other, the plurality of second reservoirs are configured to maintain different volumes of the at least one second substance as each other, the plurality of third reservoirs are configured to maintain different volumes of the at least one third substance as each other, or any combination thereof.

In some embodiments, each of the plurality of fourth reservoirs are configured to maintain a volume of the at least one fourth substance that is at least as large as the volume of the at least one third substance maintained by each of the plurality of the third reservoirs, and optionally wherein the volume of the at least one fourth substance maintained by each of the plurality of fourth reservoirs is two, three, four, five, or greater than five times that maintained by each of the plurality of the third reservoirs.

In some embodiments, the plurality of first reservoirs are in fluid communication with each other and with one, optionally more than one, first fluid inlet such that each of the plurality of first reservoirs can be filled with the at least one first substance by introducing a sufficient volume of the at least one first substance into the first fluid inlets or inlets.

In some embodiments, the plurality of second reservoirs are in fluid communication with each other and with one, optionally more than one, second fluid inlet such that each of the plurality of second reservoirs can be filled with the at least one second substance by introducing a sufficient volume of the at least one second substance into the second fluid inlets or inlets.

In some embodiments, the plurality of third reservoirs are in fluid communication with each other and with one, optionally more than one, third fluid inlet such that each of the plurality of third reservoirs can be filled with the at least one third substance by introducing a sufficient volume of the at least one third substance into the third fluid inlets or inlets.

In some embodiments, the at least one fourth substance comprises a separation medium, optionally a size exclusion matrix.

In some embodiments, the device has overall dimensions of a standard 96, 384, 1024, or 1536 well multiwell plate and individual reservoirs of each of the pluralities of first, second, third, and fourth reservoirs are located in positions that correspond to column locations of the standard 96, 384, 1024, or 1536 well multiwell plate and/or wherein the device is configured for placement in an adaptor that itself has overall dimensions of a standard 96, 384, 1024, or 1536 well multiwell plate, wherein the adaptor orients the device such that individual reservoirs of each of the pluralities of first, second, third, and fourth reservoirs are located in positions that correspond to column locations of the standard 96, 384, 1024, or 1536 well multiwell plate.

In some embodiments, the device further comprises a detection window that is substantially transparent to light in the ultraviolet (UV)/visible spectrum, optionally wherein the device itself is substantially transparent to light in the ultraviolet (UV)/visible spectrum. In some embodiments, the device has the overall dimensions of a standard 96, 384, 1024, or 1536 well or is configured for placement in the adaptor that itself has overall dimensions of a standard 96, 384, 1024, or 1536 well multiwell plate when the third reservoirs containing the completed and purified reaction product are located with the detection window.

In some embodiments, the device comprises 3, 4, 5, 6, 7, 8, 9, or 10 of each of the pluralities of first, second, third, and fourth reservoirs.

In some embodiments, the first and second surfaces are glass and the plurality of first, second, third, and fourth reservoirs are wet-etched into the first and second surfaces. In some embodiments, the first and second surfaces are produced by a method selected from the group consisting of three-dimensional (3D) printing, hot embossing, and injection molding in a thermoplastic material, or a combination thereof.

In some embodiments, the device further comprises one or more additional pluralities of reservoirs.

In some embodiments, the device further comprises a barrier between the first and second surfaces, optionally a thin layer of water-immiscible oil, located such that unintended fluid transfer does not occur in any gap between the first and second surfaces. In some embodiments, the barrier also functions lubricate the first and second surfaces as they are moved relative to one another.

In some embodiments, the fourth reservoirs comprise at least 4, 5, 6, or more sub-reservoirs. In some embodiments, the fourth reservoirs maintain at least enough of the at least one fourth substance to provide at least 80%, 85%, 90%, or 95% retention of the fourth substance therein and at least 95%, 96%, 97%, 98%, or 99% removal of the first substance from the fourth reservoirs.

Also provided in in some embodiments of the presently disclosed subject matter are methods for optimizing conjugation of ligands with detectable agents. In some embodiments, the methods comprise (a) introducing into each member of the plurality of first reservoirs of the device as disclosed herein an amount of the detectable agent; (b) introducing into each member of the plurality of second reservoirs of the device a volume of a dilution buffer; (c) introducing into each member of the plurality of third reservoirs of the device an amount of the ligand; (d) moving the first and second surfaces of the device relative to each other such that individual members of the plurality of first reservoirs come into a first fluid communication with individual members of the plurality of second reservoirs and maintaining the first fluid communication for a time sufficient for the contents of the first and second reservoirs to create a plurality of homogenous solutions; (e) subsequent to step (d), moving the first and second surfaces of the device relative to each other such that individual members of the plurality of first reservoirs come into a second fluid communication with individual members of the plurality of third reservoirs and maintaining the second fluid communication for a time sufficient for the detectable agent and the ligand to conjugate; (f) subsequent to step (e), moving the first and second surfaces of the device relative to each other such that individual members of the plurality of fourth reservoirs come into a third fluid communication with individual members of the plurality of third reservoirs and maintaining the third fluid communication for a time sufficient for any unreacted detectable agent to diffuse out of the third reservoir; (g) subsequent to step (f), moving the first and second surfaces of the device relative to each other such that all fluid communication among the first, second, and fourth reservoirs is extinguished; (h) detecting the degree to which the detectable agent conjugated to the ligand in each of the plurality of fourth reservoirs; and (i) determining which of the plurality of the four reservoirs contained an optimal degree of conjugation of the detectable agent to the ligand. In some embodiments, the detectable agent is detectable by analysis in the ultraviolet (UV)/visible spectrum. In some embodiments, the detectable agent comprises a fluorescent moiety, a chromophore, an enzyme for which a chromogenic substrate is available, or any combination thereof. In some embodiments, the detecting step is performed using a microplate reader, a scanner, a microarray scanner, or a gel imaging system. In some embodiments, the ligand is a protein, optionally an antibody or a fragment or derivative thereof. In some embodiments, the optimal degree of conjugation of the detectable agent to the ligand is about 2-8, optionally about 2-5.

BRIEF DESCRIPTION OF THE FIGURES

FIG. 1A is a schematic of a prototype version of an exemplary SlipChip device of the presently disclosed subject matter that can be employed, for example, for optimization of protein derivatization. FIG. 1B depicts an exemplary SlipChip device of the presently disclosed subject matter that can be employed for optimizing labeling of proteins (e.g., antibodies) with detectable labels (e.g., dyes). By using a constant input amount of the detectable label and diluting the same in differing volumes of buffer, a large range of different labeling ratios (e.g., 1:1 to 20:1 or greater) can be achieved. FIG. 1B also depicts detection window 185 through which detection of the degree to which the protein of interest has been labeled can be assayed by moving the plurality of fourth reservoirs 140 into a plurality of detectable positions 188.

FIG. 2, row vi.).

FIG. 4 is a plot showing quantification of diffusion of the dye into sample reservoir depicts as line-scans of fluorescent intensities was taken over time (0, 3, 10, and 30 minutes). The top line-scan represents the initial fluorescent intensity readings, the next lower line-scan represents the fluorescent intensity reading at 3 minutes, below that are the fluorescent intensity readings at 10 minutes, and the lowest amplitude line-scan represents the fluorescent intensity readings at 30 minutes. It can be seen from FIG. 4 that uniform mixing was complete after 30 minutes, and was approximately 84% complete after 10 minutes.

FIG. 5C is a line-scan of fluorescent intensity over time for ALEXAFLUOR® 594-labeled antibody (several lines grouped together near the bottom of the scan corresponding to labeled antibody after 1, 5, 10, and 25 minutes of exposure to the size exclusion gel) and free fluorescein dye (four distinguishable lines near the middle of the scan corresponding to unreacted fluorescein extracted from the reaction after 1, 5, 10, and 20 minutes) in a single sample reservoir aligned on top of a gel reservoir. As expected, the concentration of dye in the gel increased over time, whereas the concentration of antibody remained constant and negligible. FIG. 5D is a graph of fluorescent intensity of ALEXAFLUOR® 594-labeled antibody (closed circles) and fluorescein (closed squared) over several dye removal steps. In the sample (i.e., ALEXAFLUOR® 594-labeled antibody) reservoir after 80 minutes, the ALEXAFLUOR®-594 antibody retained 95% of its original intensity, whereas fluorescein retained only 14%.

DETAILED DESCRIPTION

Figure 1A:
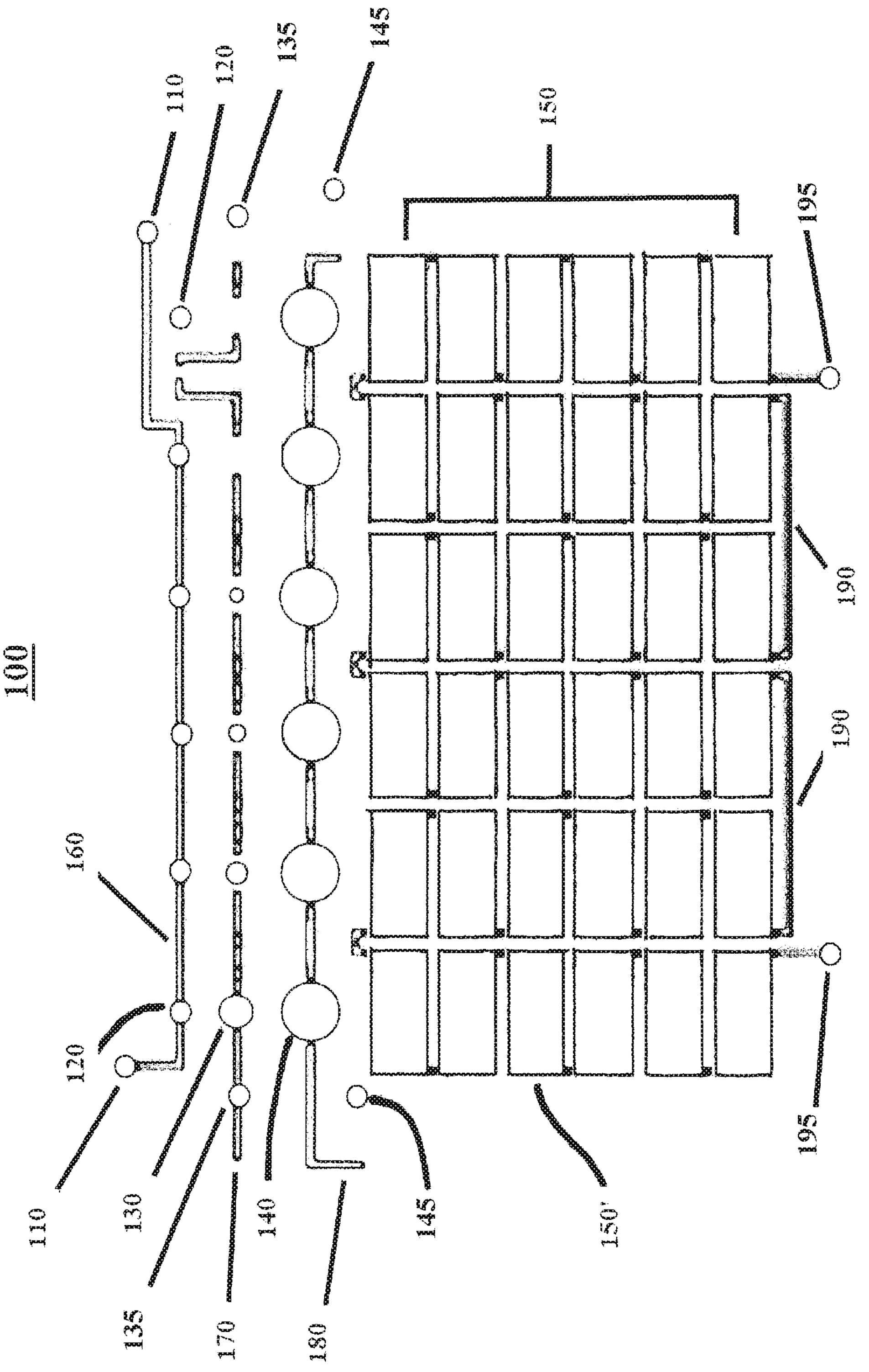
FIGS. 1A and 1B depict exemplary devices of the presently disclosed subject matter.
Figure 1B:
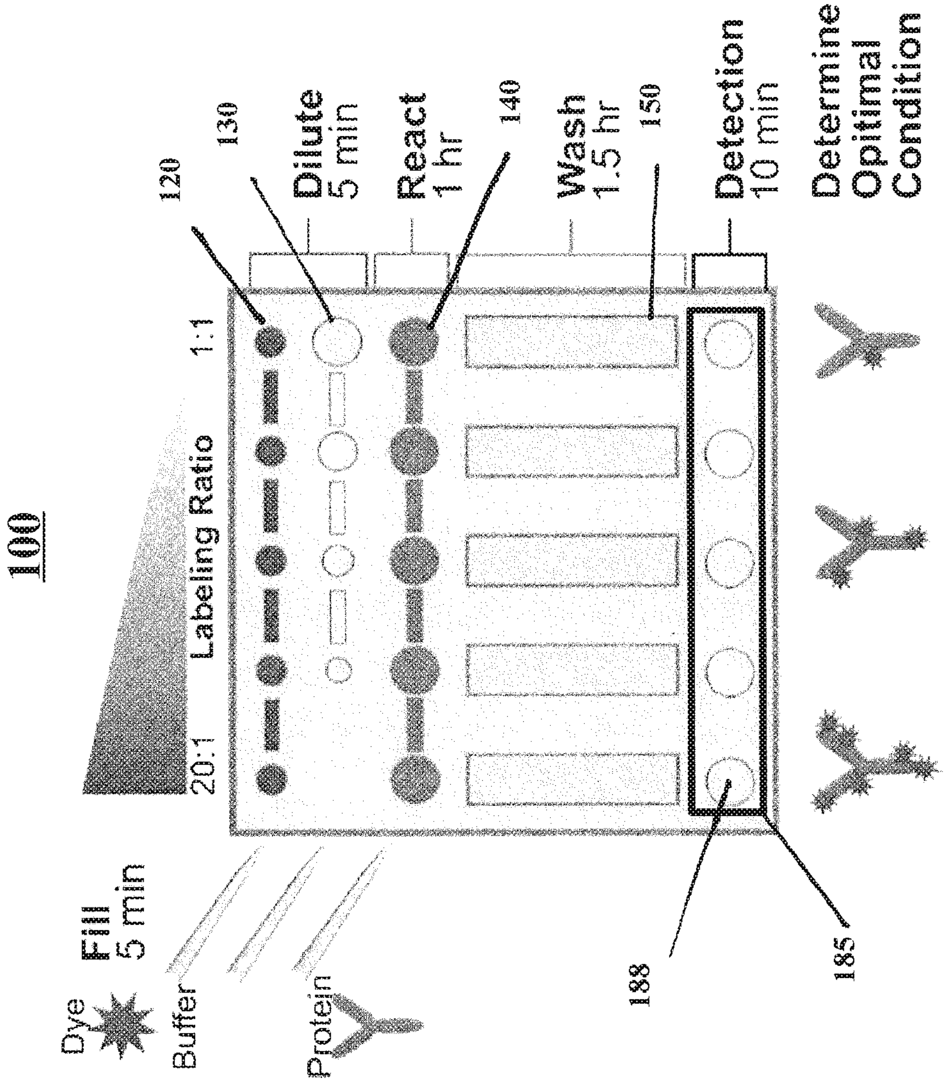

Labeling of proteins, such as antibodies, with fluorophores is a common precursor to immunostaining, immunoblotting, and other detection techniques. The degree of derivatization must be precisely controlled to maintain optimal function of the labelled protein; this is accomplished through a series of experiments performed with varied mole ratios of dye to protein (e.g., 10–2-fold excess), consuming a substantial amount of precious protein. A simple, rapid analysis of protein labeling is needed to conserve time and reagents, and optimized reagent ratios should be directly scalable for lab use. SlipChips offer a unique solution to these issues by providing a hand-operated platform that requires no specialized equipment or training to operate. To perform and analyze multiple labeling reactions in parallel, disclosed herein is a SlipChip, which in some embodiments comprises two glass layers containing an array of wells and channels. In some embodiments, the glass was wet etched to multiple depths to provide precise volumetric control during reagent filling, dilution, and labeling. Protein and dye were loaded onto the device by pipet, using <5 μL of protein at stock concentrations as low as 1 mg/mL. The first slip of the device performed a precise dilution of dye. In initial examples, the device performed a 1 to 5-fold dilution of a model dye (0.1 M $FeSCN^{2-}_{(aq)}$), yielding a linear concentration range with respect to absorbance ($R^2$=0.994). A second slip mixed the dye with protein sample and then the device was slipped again to remove excess dye from the sample. Wells filled with crosslinked polyacrylamide gel were used as a molecular weight filter, excluding protein sample and extracting the dye. Preliminary results showed that 20% polyacrylamide gel was capable of removing a substantial amount of dye while excluding antibody sample. In some embodiments, disclosed herein is accurate dilution of dye on chip, mixing of dye with sample, and removal of dye from sample. In some embodiments, these processes are integrated to provide rapid, small-scale optimization of protein derivatization, which in some embodiments is compatible with UV-VIS plate reader detection.

Disclosed herein in some embodiments is a novel SlipChip device that provides multiplexed, on-chip protein derivatization reactions, using a minimal volume of protein, to rapidly determine the optimal mole ratio of the labelling reagent to the protein for subsequent scale up. A prototype device was made and its key features tested.

In some embodiments, the prototype device comprises two glass layers. The glass was wet etched to multiple depths to provide precise volumetric control during use. The wells and channels etched in the two layers interconnect to form continuous channels for filling, and then are slipped apart to isolate individual wells and perform various mixing steps. A layer of immiscible fluorocarbon oil (such as, but not limited to FC-40 with a fluorinated surfactant) is used to isolate the aqueous solution in the wells and prevent protein adsorption (Li & Ismagilov, 2010; Li et al., 2010; Liang et al., 2014; Chang et al., 2015). It is noted that the device design is also compatible with mass fabrication techniques such as hot embossing in polymeric materials.

Summarily, chemical conjugation of proteins with groups such as fluorophores often involve a large number of trials to optimize the conjugation reaction to achieve a desired label-to-protein ratio. These trials often involve using large amounts of precious protein reagent (e.g. 50-100 μL). In some embodiments provided herein is a novel microfluidic device that uses only nanoliter volumes and multiplexes the reaction to test multiple mole ratios simultaneously, thus conserving both experimental time and reagent.

I. Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the presently disclosed and claimed subject matter.

Following long-standing patent law convention, the terms "a", "an", and "the" refer to "one or more" when used in this application, including in the claims. For example, the phrase "an antibody" refers to one or more antibodies, including a plurality of the same antibody. Similarly, the phrase "at least one", when employed herein to refer to an entity, refers to, for example, 1, 2, 3, 4, 5, 6, 7, 8, 9, 10, 15, 20, 25, 30, 35, 40, 45, 50, 75, 100, or more of that entity, including but not limited to whole number values between 1 and 100 and greater than 100.

Unless otherwise indicated, all numbers expressing quantities of ingredients, reaction conditions, and so forth used in the specification and claims are to be understood as being modified in all instances by the term "about". The term "about", as used herein when referring to a measurable value such as an amount of mass, weight, time, volume, concentration, or percentage, is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods and/or employ the disclosed compositions. Accordingly, unless indicated to the contrary, the numerical parameters set forth in this specification and attached claims are approximations that can vary depending upon the desired properties sought to be obtained by the presently disclosed subject matter.

As used herein, the term "and/or" when used in the context of a list of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including" "containing", or "characterized by", is inclusive or open-ended and does not exclude additional, unrecited elements and/or method steps. "Comprising" is a term of art that means that the named elements and/or steps are present, but that other elements and/or steps can be added and still fall within the scope of the relevant subject matter.

As used herein, the phrase "consisting of" excludes any element, step, or ingredient not specifically recited. It is noted that, when the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of the related disclosure or claim to the specified materials and/or steps, plus those that do not materially affect the basic and novel characteristic(s) of the disclosed and/or claimed subject matter. For example, a pharmaceutical composition can "consist essentially of" a pharmaceutically active agent or a plurality of pharmaceutically active agents, which means that the recited pharmaceutically active agent(s) is/are the only pharmaceutically active agent(s) present in the pharmaceutical composition. It is noted, however, that carriers, excipients, and/or other inactive agents can and likely would be present in such a pharmaceutical composition and are encompassed within the nature of the phrase "consisting essentially of".

With respect to the terms "comprising", "consisting of", and "consisting essentially of", where one of these three terms is used herein, the presently disclosed and claimed subject matter can include the use of either of the other two terms. For example, in some embodiments, the presently disclosed subject matter relates to compositions comprising antibodies. It would be understood by one of ordinary skill in the art after review of the instant disclosure that the presently disclosed subject matter thus encompasses compositions that consist essentially of the antibodies of the presently disclosed subject matter, as well as compositions that consist of the antibodies of the presently disclosed subject matter.

The term "reservoir" as used herein refers to a site where two or more substances are exposed to one another. The "reservoir" can be in some embodiments less than about 100 nm, in some embodiments less than about 30 nm, and in some embodiments be less than about 3-nm. The term also refers to a portion along a surface that is capable of maintaining a substance therein or therealong. The "reservoir" can take on a physical structure such as a hole, a well, a cavity, or an indentation, and have any cross-sectional shape along its length, width, or depth, such as rectangular, circular, or triangular. The term "between" when used in the context of moving between "a first position" and a "second position" can refer to movement only from a first position to a second position, movement only from a second position to a first position, or movement from a first position to a second position and from the second position to the first position.

The terms "react" and "reaction" refer to a physical, chemical, biochemical, and/or biological transformations that involves at least one substance, e.g., reactant, reagent, phase, carrier fluid, or plug-fluid and that generally involves (in the case of chemical, biochemical, and biological transformations) the breaking or formation of one or more bonds such as covalent, noncovalent, van der Waals, hydrogen, or ionic bonds. The term includes typical photochemical and electrochemical reactions, typical chemical reactions such as synthetic reactions, neutralization reactions, decomposition reactions, displacement reactions, reduction-oxidation reactions, precipitation, crystallization, combustion reactions, and polymerization reactions, as well as covalent and noncovalent binding, phase change, color change, phase formation, dissolution, light emission, changes of light absorption or emissive properties, temperature change or heat absorption or emission, conformational change, and folding or unfolding of a macromolecule such as a protein.

The term "substance" as used herein refers to any chemical, compound, mixture, solution, emulsion, dispersion, suspension, molecule, ion, dimer, macromolecule such as a polymer or protein, biomolecule, precipitate, crystal, chemical moiety or group, particle, nanoparticle, reagent, reaction product, solvent, or fluid, and any one of which can exist in the solid, liquid, or gaseous state, and which is typically the subject of an analysis.

The term "exposed" as used herein is a form of communication between two or more elements. These elements can in some embodiments include a substance, a reservoir, a duct, a passage, a channel, a lumen, or any combination thereof. In some embodiments, "exposed" can mean that two or more substances are in fluidic communication with each other, or alternatively, in some embodiments it can mean that two or more substances react with one another.

The term "fluidic communication," as used herein, refers to any duct, channel, tube, pipe, or pathway through which a substance, such as a liquid, gas, or solid can pass substantially unrestricted when the pathway is open. When the pathway is closed, the substance is substantially restricted from passing through. In embodiments where a substrate is present, a substance can pass from one reaction reservoir to another through the substrate when the device is in the closed position, if the reaction reservoirs are spatially positioned to allow diffusion via the substrate versus passage via a pathway. Typically, limited diffusion of a substance through the material of a plate, base, and/or a substrate, which in some embodiments can or in some embodiments cannot occur depending on the compositions of the substance and materials, does not constitute fluidic communication.

In some embodiments, a device of the presently disclosed subject matter comprises two glass layers, each having a plurality of reservoirs present thereon. The glass can be wet etched to multiple depths to provide precise volumetric control during use. In some embodiments, the wells and channels etched in the two layers can interconnect to form continuous channels for filling, and then are slipped apart to isolate individual wells and perform various mixing steps. In some embodiments, a layer of immiscible fluorocarbon oil (FC-40 with a fluorinated surfactant) can be used to isolate the aqueous solution in the wells and prevent protein adsorption (Li & Ismagilov, 2010; Li et al., 2010; Liang et al., 2014; Chang et al., 2015). It is noted that the device design is also compatible with mass fabrication techniques such as hot embossing in polymeric materials.

Polymeric materials suitable for use with the presently disclosed subject matter can in some embodiments be organic polymers. Such polymers can in some embodiments be homopolymers or copolymers, naturally occurring or synthetic, crosslinked, or non-crosslinked. Specific polymers of interest include, but are not limited to, polyimides, polycarbonates, polyesters, polyamides, polyethers, polyurethanes, polyfluorocarbons, polystyrenes, poly(acrylonitrile-butadiene-styrene)(ABS), acrylate and acrylic acid polymers such as polymethyl methacrylate, and other substituted and non-substituted polyolefins, and copolymers thereof. Generally, at least one of the substrates or a portion of the device comprises a biofouling-resistant polymer when the microdevice is employed to transport biological fluids. Polyimide is of particular interest and has proven to be a highly desirable substrate material in a number of contexts. Polyimides are commercially available, e.g., under the tradename KAPTON®, (DuPont, Wilmington, Del., United States of America) and UPILEX® (Ube Industries, Ltd., Japan). Polyetheretherketones (PEEK) also exhibit desirable biofouling resistant properties. Polymeric materials suitable for use with the invention include silicone polymers, such as polydimethylsiloxane, and epoxy polymers.

In some embodiments, devices in accordance with the presently disclosed subject matter can comprise a "composite," i.e., a composition comprised of unlike materials. The composite can in some embodiments be a block composite, e.g., an A-B-A block composite, an A-B-C block composite, or the like. Alternatively, the composite can in some embodiments be a heterogeneous combination of materials, i.e., in which the materials are distinct from separate phases, or a homogeneous combination electrode overlaps the at least one reservoir. Several embodiments of the current invention require movement of a substance through, into, and/or across at least one duct and/or reservoir. For example, movement of a substance can be used for washing steps in immunoassays, removal of products or byproducts, introduction of reagents, or dilutions. of unlike materials. As used herein, the term "composite" is used to include a "laminate" composite. A "laminate" refers to a composite material formed from several different bonded layers of identical or different materials. Other exemplary composite substrates include polymer laminates, polymer metal laminates, e.g., polymer coated with copper, a ceramic in-metal or a polymer-in-metal composite. One exemplary composite material is a polyimide laminate formed from a first layer of polyimide such as the KAPTON® brand polyimide laminate, that has been coextruded with a second, thin layer of a thermal adhesive form of polyimide known as the KJ® brand polyimide, also available from DuPont (Wilmington, Del., United States of America). The device can be fabricated using techniques such as compression molding, injection molding or vacuum molding, alone or in combination. Sufficiently hydrophobic material can be directly utilized after molding. Hydrophilic material can also be utilized, but in some embodiments can require additional surface modification. Further, the device can also be directly milled using CNC machining from a variety of materials, including, but not limited to, plastics, metals, and glass. Microfabrication techniques can be employed to produce the device with submicrometer feature sizes. These include, but are not limited to, deep reactive ion etching of silicon, KOH etching of silicon, and HF etching of glass. Polydimethylsiloxane devices can also be fabricated using a machined, negative image stamp. In addition to rigid substrates, flexible, stretchable, compressible and other types of substrates that in some embodiments can change shape or dimensions can be used as materials for certain embodiments of the SlipChip. In some embodiments, these properties can be used to, for example, control or induce slipping.

In some embodiments, the first and second surfaces (e.g., the base and plate) and substrate can comprise the same material. Alternatively, different materials can be employed. For example, in some embodiments the base and plate can comprise a ceramic material and the substrate can comprise a polymeric material.

The device can comprise electrically conductive material on either surface. The material can in some embodiments be formed into at least one reservoir or patch of any shape to form an electrode. The at least one electrode can be positioned on one surface such that in a first position, the at least one electrode is not exposed to at least one first reservoir on the opposing surface, but when the two parts of the device are moved relative to one another to a second position, the at least one electrode overlaps the at least one reservoir. The at least one electrode can in some embodiments be electrically connected to an external circuit. The at least one electrode can in some embodiments be used to carry out electrochemical reactions for detection and/or synthesis.

II. Reaction Devices and Methods

Referring now to the Figures, and in particular to FIGS. 1A, 1B, 2, 5A, and 5B, a reaction device for carrying out a reaction is referred to generally at 100. Device 100 comprises a first part 102 having a first surface 104 and a second part 106 having a second surface 108 opposed to first surface 104. Device 100 comprises a plurality of first reservoirs 120 located along a portion of first surface 104. In some embodiments, each of the plurality of first reservoirs 120 is configured to maintain at least one first substance. In some embodiments, device 100 comprises a plurality of second reservoirs 120 located along a portion of second surface 108. In some embodiments, each of the plurality of second reservoirs 120 is configured to maintain at least one second substance. In some embodiments, device 100 comprises a plurality of third reservoirs 140 located along a portion of second surface 108. In some embodiments, each of the plurality of third reservoirs 140 is configured to maintain at least one third substance. In some embodiments, device 100 comprises a plurality of fourth reservoirs 150 located along a portion of first surface 104. In some embodiments, each of the plurality of fourth reservoirs 150 is configured to maintain at least one fourth substance. Optionally, one or more, optionally each, of the plurality of fourth reservoirs 150 is separated into two, three, four, five, six, or more subreservoirs 150'.

Continuing with reference to FIGS. 1A, 1B, 2, 5A, and 5B, first surface 104 and second surface 108 are configured to move relative to each other between a first position in which the plurality of first 120, second 130, third 140, and fourth 150 reservoirs are not exposed to any of the other first 120, second 130, third 140, or fourth 150 reservoirs; a second position in which at least one of the plurality of first reservoirs 120 is exposed to at least one of the plurality of the second reservoirs 130 and none of the third 140 or fourth 150 reservoirs; a third position in which at least one of the plurality of first reservoirs 120 is exposed to at least one of the plurality of the third reservoirs 140 and none of the second 130 or fourth reservoirs 150; a fourth position in which at least one of the plurality of first reservoirs 120 is exposed to at least one of the plurality of the fourth reservoirs 150 and none of the second 130 or third reservoirs 140; and a fifth position in which the plurality of first 120, second 130, third 140, and fourth reservoirs 150 are not exposed to any of the other first 120, second 130, third 140, or fourth reservoirs 150. In some embodiments, the first part 102 and the second part 106 are engaged with each other before and after the relative motion.

In some embodiments, the plurality of first reservoirs 120 are configured to maintain the same volume of the at least one first substance as each other. In some embodiments, the plurality of second reservoirs 130 are configured to maintain different volumes of the at least one second substance as each other. In some embodiments the plurality of third reservoirs 140 are configured to maintain the same volume of the at least one third substance as each other. In some embodiments, each of the plurality of fourth reservoirs 150 are configured to maintain a volume of the at least one fourth substance that is at least as large as the volume of the at least one third substance maintained by each of the plurality of the third reservoirs 140. Optionally, the volume of the at least one fourth substance maintained by each of the plurality of fourth reservoirs 150 is two, three, four, five, or greater than five times that maintained by each of the plurality of the third reservoirs 140.

In some embodiments, the plurality of first reservoirs 120 are in fluid communication with each other via first fluid channel 160 and with one, optionally more than one, first fluid inlet 110 such that each of the plurality of first reservoirs 120 can be filled with the at least one first substance by introducing a sufficient volume of the at least one first substance into the first fluid inlets or inlets 110. In some embodiments, the plurality of second reservoirs 130 are in fluid communication with each other via second fluid channel 170 and with one, optionally more than one, second fluid inlet 135 such that each of the plurality of second reservoirs 130 can be filled with the at least one second substance by introducing a sufficient volume of the at least one second substance into the second fluid inlets 135. In some embodiments, the plurality of third reservoirs 140 are in fluid communication with each other via third fluid channel 180 and with one, optionally more than one, third fluid inlet 145 such that each of the plurality of third reservoirs 140 can be filled with the at least one third substance by introducing a sufficient volume of the at least one third substance into the third fluid inlets 145. In some embodiments, the plurality of fourth reservoirs 150 are in fluid communication with each other via fourth fluid channel 190 and with one, optionally more than one, fourth fluid inlets 195 such that each of the plurality of fourth reservoirs 150 can be filled with the at least one fourth substance by introducing a sufficient volume of the at least one fourth substance into the fourth fluid inlets 195. In some embodiments, the at least one fourth substance comprises a separation matrix, optionally a size exclusion matrix. In some embodiments, one or more of first fluid inlets 110, second fluid inlets 135, third fluid inlets 145, and/or fourth fluid inlets 195, are of a size sufficient to accept a standard pipette tip. In some embodiments, each of first fluid inlets 110, second fluid inlets 135, third fluid inlets 145, and/or fourth fluid inlets 195, are of a size sufficient to accept a standard pipette tip.

In some embodiments, device 100 has overall dimensions of a standard 96, 384, 1024, or 1536 well multi-well plate and individual reservoirs of each of the pluralities of first, second, third, and fourth reservoirs 120, 130, 140, 150 are located in positions that correspond to column locations of the standard 96, 384, 1024, or 1536 well multi-well plate. In some embodiments, device 100 comprises 3, 4, 5, 6, 7, 8, 9, or 10 of each of the pluralities of first, second, third, and fourth reservoirs 120, 130, 140, 150.

In some embodiments, first and second surfaces 104, 108 are glass and the plurality of first, second, third, and fourth reservoirs 120, 130, 140, 150 are wet-etched into first and second surfaces 104, 108. In some embodiments, first and second surfaces 104, 108 of device 100 are prepared using an additive manufacturing technique and/or device (e.g., are "three-dimensionally (3D)-printed" using a "3D printer"). Representative additive manufacturing techniques include but are not limited to inkjet printing (IJP), fused deposition modeling (FDM), selective laser sintering (SLS), electron beam melting (EBM), selective laser melting (SLM), and ultrafast laser processing. Feedstock materials for the additive manufacturing techniques can comprise the polymeric materials described elsewhere herein.

By way of exemplification and not limitation, methods to 3D print device 100 on a high-resolution, commercially available stereolithography printer are provided. An optically-clear resin is chosen for printing. Device 100 is rescaled as needed to minimize the 3D printed build size and take advantage of the ease of integrating a holder into the 3D design. Device 100 is validated for functionality as disclosed herein and is further validated for compatible with a plate reader, and for concordance between the labeling ratios on chip and off-chip at larger scale. The 3-D printed device provides for rapid, small-scale optimization of protein derivatization. While demonstrated herein for antibodies and fluorophores, the presently disclosed devices and methods are applicable to any protein >50 kDa and any drug or label that absorbs in UV-Vis. In some embodiments, the device requires only pipet and access to a plate reader to use and consumes at least 10-fold less protein per reaction than standard methods (on average 5 μg vs ≥150 μg for 5 reactions, respectively).

In some embodiments, device 100 further comprises one or more additional pluralities of reservoirs. In some embodiments, device 100 comprises a barrier between the first and second surfaces, optionally a thin layer of water-immiscible oil, located such that unintended fluid transfer does not occur in any gap between the first and second surfaces 104, 108. In some embodiments, the barrier also functions lubricate the first and second surfaces as they are moved relative to one another. In some embodiments, device 100 further comprises detection window 185 that is substantially transparent to light in the ultraviolet (UV)/visible spectrum and into which the plurality of fourth reservoirs 140 can be moved to assume a plurality of detectable positions 188.

In some embodiments, device 100 comprises a configuration that facilitates combinations of serial dilution, mixing, and separation that further facilitate labelling reactions on device 100. Reagents are diluted, combined in varying ratios, and separated from unreacted label. The extent of the reaction is detected on device 100 for easy optimization. In some embodiments, additional reservoirs are also desirable, for example if one wanted to carry out more than one reaction (e.g., initiate a reaction, let it go to completion, purify the desired reaction product, and then proceed to another reaction).

In some embodiments, the presently disclosed subject matter provides a method for optimizing conjugation of a ligand with a detectable agent. In some embodiments, the method comprises introducing into each member of the plurality of first reservoirs of device an equal amount of the detectable agent. In some embodiments, the method comprises introducing into each member of the plurality of second reservoirs of the device a different volume of a dilution buffer. In some embodiments, the method comprises introducing into each member of the plurality of third reservoirs of the device an equal amount of the ligand. In some embodiments, the method comprises moving the first and second surfaces of the device relative to each other such that individual members of the plurality of first reservoirs come into a first fluid communication with individual members of the plurality of second reservoirs and maintaining the first fluid communication for a time sufficient for the contents of the first and second reservoirs to create a plurality of homogenous solutions. In some embodiments, the method comprises moving the first and second surfaces of the device relative to each other such that individual members of the plurality of second reservoirs come into a second fluid communication with individual members of the plurality of third reservoirs and maintaining the second fluid communication for a time sufficient for the detectable agent and the ligand to conjugate. In some embodiments, the method comprises moving the first and second surfaces of the device relative to each other such that individual members of the plurality of fourth reservoirs come into a third fluid communication with individual members of the plurality of third reservoirs and maintaining the third fluid communication for a time sufficient for any unreacted detectable agent to diffuse out of the fourth reservoir. In some embodiments, the method comprises moving the first and second surfaces of the device relative to each other such that all fluid communication among the first, second, and fourth reservoirs is extinguished. In some embodiments, the method comprises detecting the degree to which the detectable agent conjugated to the ligand in each of the plurality of fourth reservoirs. In some embodiments the method comprises determining which of the plurality of the four reservoirs contained an optimal degree of conjugation of the detectable agent to the ligand.

In some embodiments, the detectable agent is detectable by analysis in the ultraviolet (UV)/visible spectrum. In some embodiments, the detectable agent comprises a fluorescent moiety. In some embodiments, the detecting step is performed using a microplate reader.

In some embodiments, the ligand is a protein, optionally an antibody or a fragment or derivative thereof. The optimal ratio of conjugated detectable agent to the ligand is in some embodiments greater than 20:1, in some embodiments about 20:1, in some embodiments about 15:1, in some embodiments about 10:1, in some embodiments about 8:1, in some embodiments about 6:1, in some embodiments about 5:1, in some embodiments about 4:1, in some embodiments about 3:1, in some embodiments about 2:1, in some embodiments about 1:1, in some embodiments about 1:2, in some embodiments about 1:3, in some embodiments about 1:4, in some embodiments about 1:5, in some embodiments about 1:6, in some embodiments about 1:8, in some embodiments about 1:10, in some embodiments about 1:15, in some embodiments about 1:20, and in some embodiments about 1:greater than 20, In some embodiments, the fourth reservoirs made up of at least 4, 5, 6, or more sub-reservoirs. In some embodiments, the fourth reservoirs maintain at least enough of the at least one fourth substance to provide at least 80%, 85%, 90%, or 95% retention of the fourth substance therein and at least 95%, 96%, 97%, 98%, or 99% removal of the unreacted first substance from the third reservoirs.

EXAMPLES

The following Examples provide illustrative embodiments. In light of the present disclosure and the general level of skill in the art, those of skill will appreciate that the following Examples are intended to be exemplary only and that numerous changes, modifications, and alterations can be employed without departing from the scope of the presently disclosed subject matter.

Example 1

The device was pre-loaded with a size-exclusion gel by filling all gel reservoirs with polyacrylamide gel precursor solution mixed with a photo-initiator (here, Irgacure) slipping the device to isolate the wells from the filling channels, and exposing to brief UV light. The shape of the gel reservoirs was specifically designed to permit gelation in the wells without forming a solid gel bridge spanning the top and bottom of the chip, which would impede subsequent slipping.

Example 2

Figure 2:
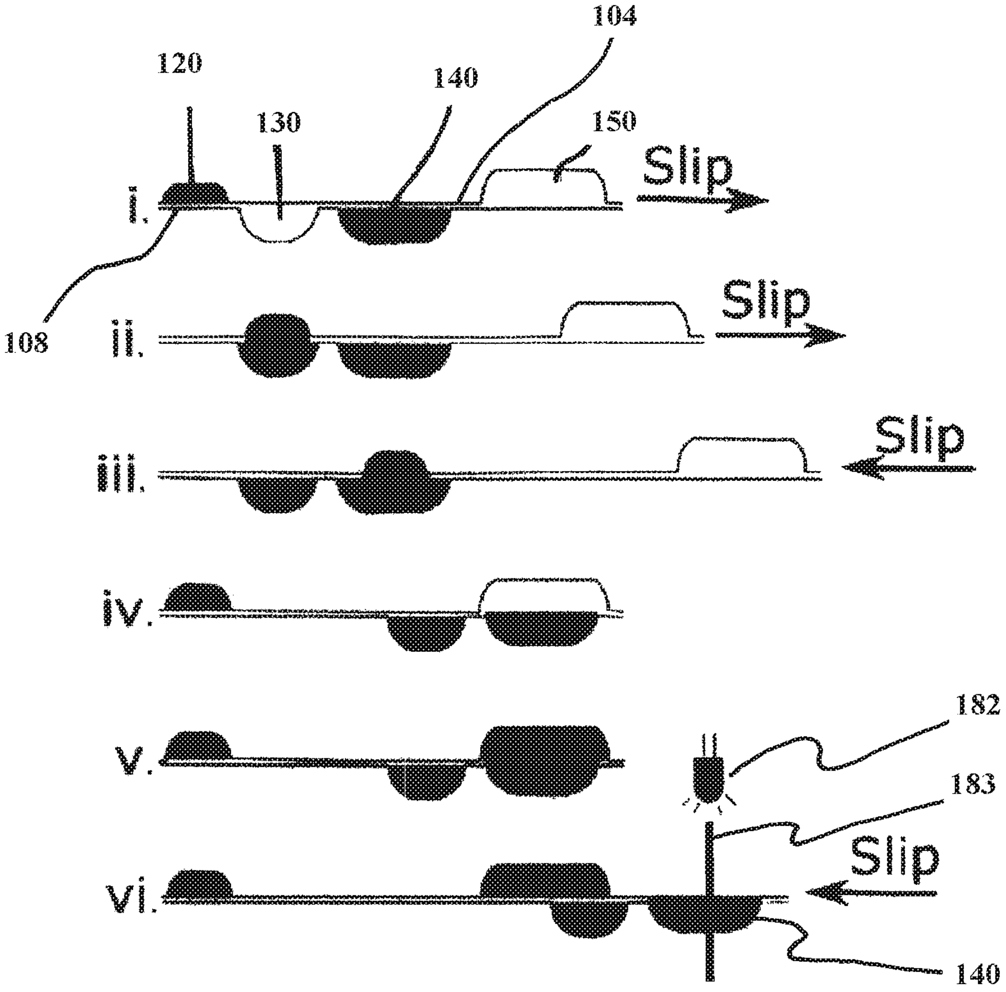
FIG. 2 depicts an exemplary slipping procedure that can be employed to perform the reaction and purification of labelled protein on the microfluidic chip. First (FIG. 2, row i.), the device is filled with each reagent. Next (FIG. 2, row ii.), top surface 104 is slipped to allow the dye in first reservoir 120 to be diluted with buffer present in second reservoir 130. Top surface 104 is then slipped again (FIG. 2, row iii.) to mix the dye in first reservoir 120 and the protein sample in third reservoir 140, which are allowed to react with each other for a pre-determined period. Excess dye is then removed by slipping top surface 104 back (FIG. 2, row iv.) so that fourth reservoir 150 containing a size exclusion gel is positioned on top of third reservoir 140 containing the dye-labeled sample. After several minutes, the unreacted dye has diffused into the gel in fourth reservoir 150, whereas larger MW protein (e.g., the conjugated and non-conjugated protein molecules) is retained in third reservoir 140 (FIG. 2, row v.). The device is then slipped again such that third reservoir 140 containing the dye-conjugated protein same is positioned under detection light source 182, which passes detection light beam 183 through third reservoir 140 containing the dye-conjugated protein to a detection device (e.g., a plate reader.

To use the device, a dye solution, buffer for dilution, and protein sample onto the device by pipette, using <5 μL of protein at stock concentrations as low as 1 mg/mL (see FIG. 2, row i.). The first slip of the device performed a precise dilution of dye (see FIG. 2, row ii.). A second slip mixed the dye with protein sample (see FIG. 2, row iii.), and then the device was slipped again to remove un-reacted dye from the sample (see FIG. 2, rows iv. And v.). Finally, a third slip positioned the now purified and dye-conjugated protein sample under a UV-vis light source present in a plate reader such that the total amount of fluorescence and thus degree of conjugation of the dye to the protein sample could be determined (see FIG. 2, row vi.)

Example 3

Figure 3:
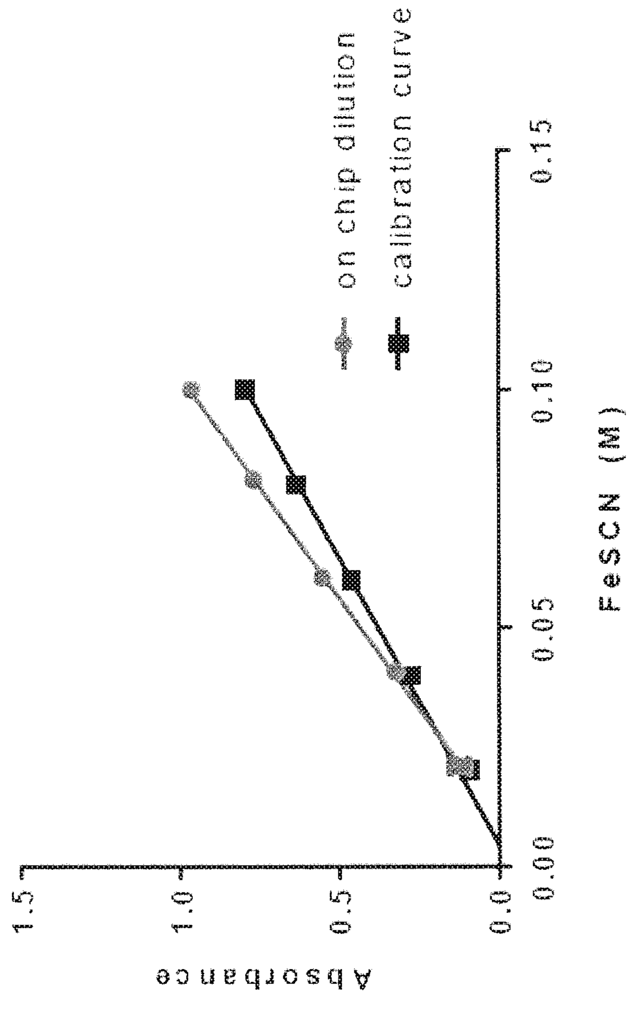
FIG. 3 is a graph of on-chip dilution (closed circles) compared to an off-chip calibration curve (closed squares) using $FeSCN^-$. The on-chip curve was linear as expected and in the expected range of absorbance.

In preliminary work, the device performed a 1- to 5-fold dilution of a model dye (0.1 M $FeSCN^{2-}$), yielding a linear concentration range with respect to absorbance ($R^2$=0.994) (FIG. 3). The linearity of the curve demonstrates that the device dilutes the dye as desired.

Example 4

Figure 4:
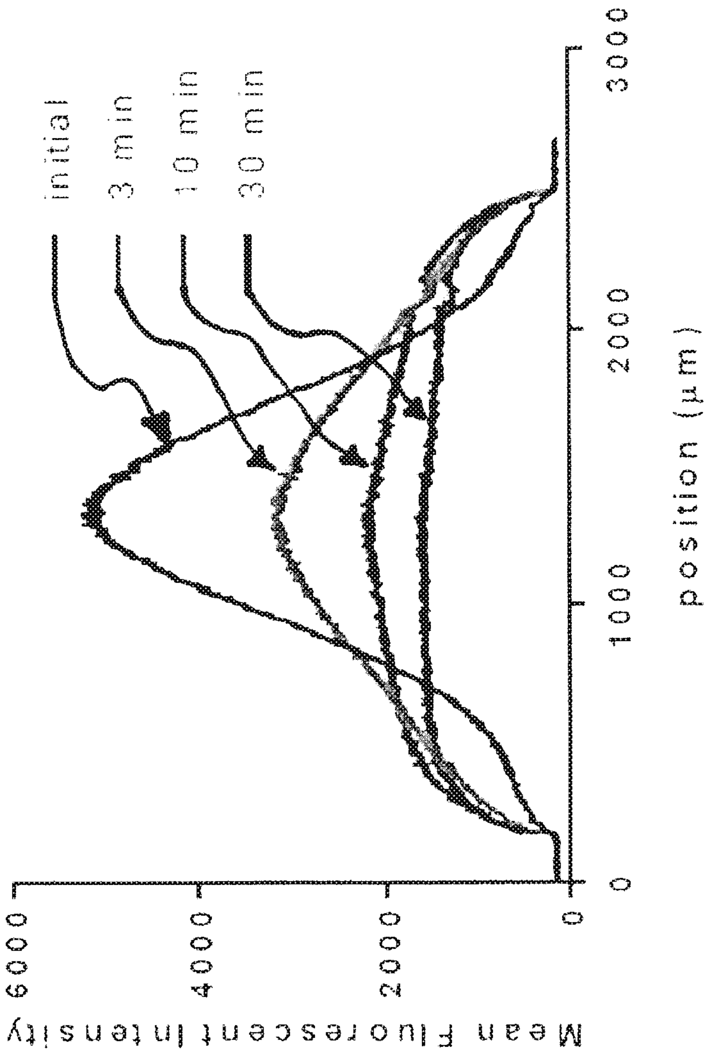
FIG. 4 shows the results of experiments that demonstrated that the mixing of dye and sample solutions proceeded to completion within minutes on the chip. As a proof-of principle, the dye reservoir was filled with fluorescein and the sample reservoir was filled with colorless buffer. The dye reservoir was slipped so that it overlapped with the sample reservoir and was imaged over time to monitor mixing via diffusion.

After dye dilution, the next step is to mix the diluted dye solution with the protein solution. Mixing on the chip occurs primarily by diffusion. The rate of mixing was determined by filling the dye chamber with fluorescein and the sample chamber with buffer, slipping to overlap, and quantifying the time until homogeneity was reached (FIG. 4). As expected for a small molecule diffusing these distances, mixing was complete in 10-30 minutes. This rate of mixing can in some embodiments be accelerated in the future by gentle slipping back and forth to induce recirculation inside the droplet.

After the derivatization reaction, removing unreacted free dye from the conjugate can be desirable so that subsequent optical measurements of dye and protein concentration are not confounded. Wells filled with crosslinked polyacrylamide gel were used as a molecular weight filter, excluding protein sample and extracting the dye using the procedure depicted in FIG. 5A.

Figure 5B:
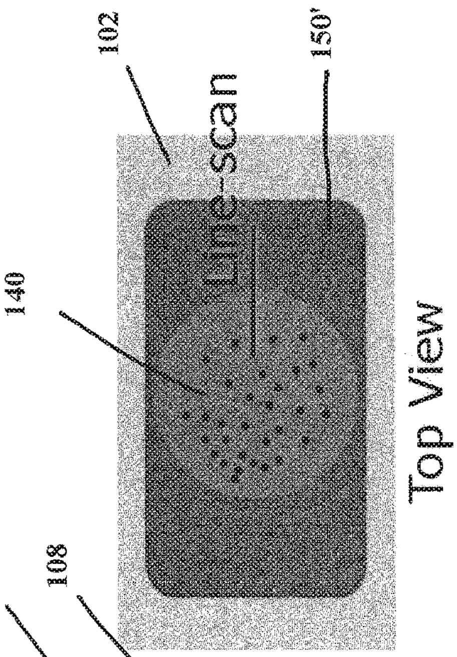
FIGS. 5A-5D depict the results of extraction of free dye from protein using a size-exclusion gel embedded in the chip. As a proof-of-principle and as depicted in FIG. 5A (side view) and FIG. 5B (top view), the dye and antibody were mixed as in FIG. 4, and then sample well 120 containing the mixture was slipped repeatedly so that it overlapped with a series gel reservoirs. In this example, the gel was 20% polyacrylamide, which was expected to exclude proteins but not small molecules.
Figure 5A:
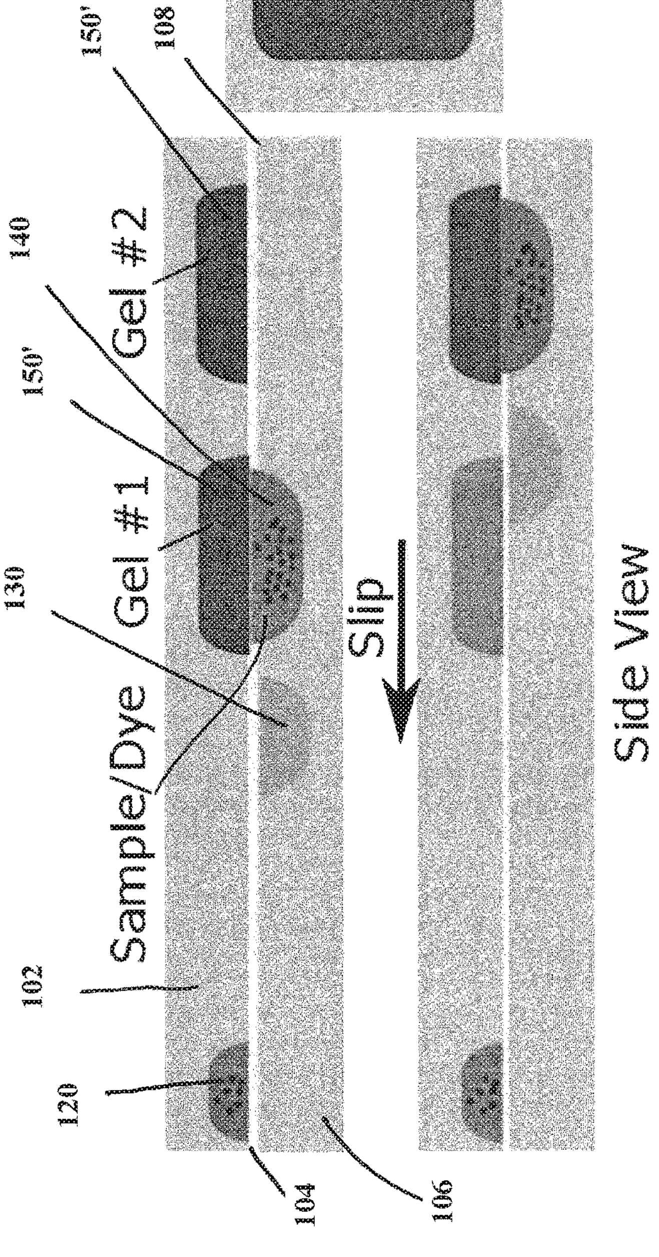
Figure 5C:
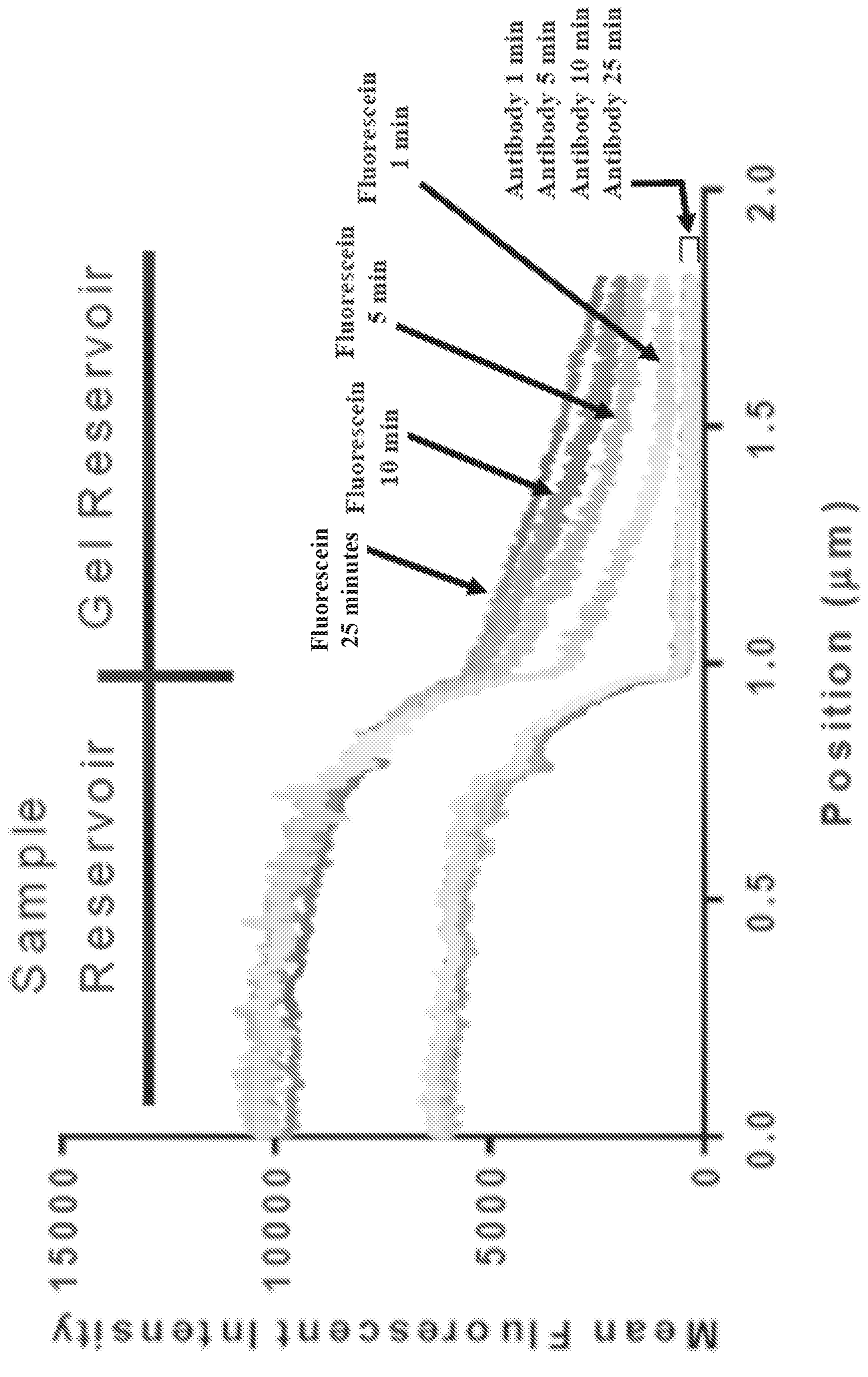

As depicted therein, the dye and antibody were mixed as in FIG. 4, and then the sample well containing the mixture was slipped repeatedly so that it overlapped with a series of three gel reservoirs. In this EXAMPLE, the gel was 20% polyacrylamide, which was capable of removing a substantial amount of unreacted dye while excluding the antibody sample (see FIGS. 5C and 5D). Particularly, FIG. 5C is a linescan plot of fluorescent intensity over time for ALEXAFLUOR® 594-labeled antibody at 1, 5, 10, and 25 minutes and free fluorescein dye at 1, 5, 10, and 20 minutes in a single sample reservoir aligned on top of a gel reservoir. It was observed that the concentration of dye in the gel increased over time, whereas the concentration of antibody remained constant and negligible.

Figure 5D:
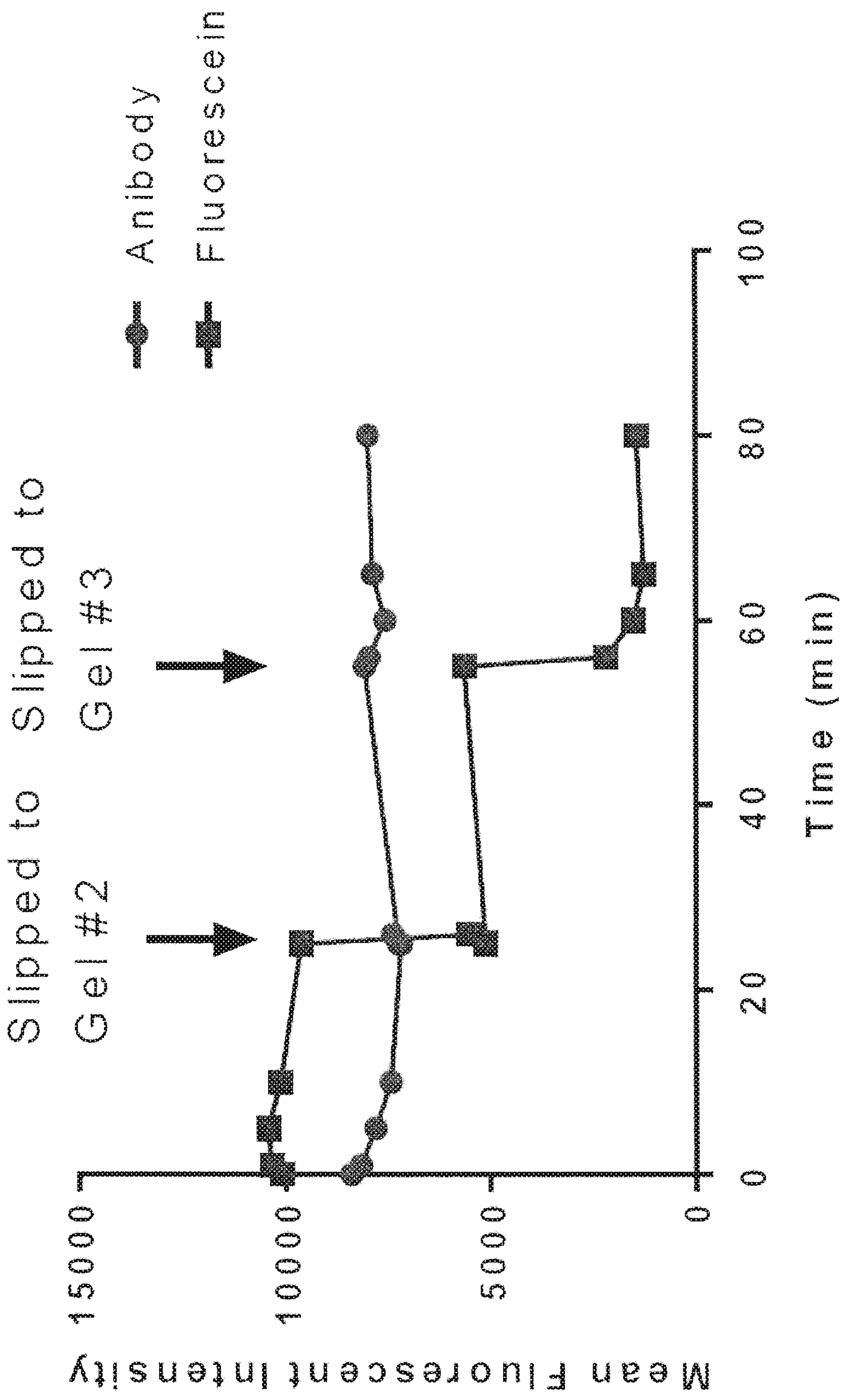

In FIG. 5D, the results of examining fluorescent intensities of ALEXAFLUOR® 594-labeled antibody and fluorescein over several dye removal steps is shown. In the sample reservoir after 80 minutes, the ALEXAFLUOR®-594-labeled antibody retained 95% of its original intensity, whereas fluorescein retained only 14%, suggesting that dye removal can be enhanced by contacting the conjugation reaction products with a gel reservoir over extended periods of time and also over several discrete gel reservoirs without resulting in significant loss of the desired conjugated product.

Example 5

Detection of label ratio by UV-Vis spectroscopy for a 3D Printed Embodiment. To further provide detection of final labeling ratios directly on the chip, a 3D printed adaptor is developed to place the device into a plate reader. The adaptor clamps the SlipChip device together and aligns the sample reservoirs to specific xy coordinates in the instrument, to enable reading like a 1536-well plate. In one example, the 3D printed adaptor comprises a track on the bottom of a container, which is used to compress the top and bottom plate together. In another example, the adaptor comprises an open bottom to accommodate absorbance measurements and to size it to match a 1536-well plate. To test alignment, the sample reservoirs are filled with ALEXAFLUOR® 488-labeled antibody, and the chip is placed in the adaptor and read at 280 nm (protein) and 488 nm (dye). Alignment is successful if the % CV of the absorbance of the sample reservoirs after 5 repetitions is <5%, and the mean is within 10% of expected value. A challenge is reproducible placement in the correct xy position. This challenge is addressed, for example, by (1) programming the reader to scan a "custom" plate layout that reads every 1 mm (the limit of motor stepping resolution of the Clariostar), or (2) enlarging the sample reservoirs to 2-3 mm, as in a 384-well plate.

Validating the device. concordance between the labeling ratios found on-chip and off-chip at larger scale is verified. Isotype control antibodies are labelled on-chip (5 dye dilutions at once) and off-chip (5 experiments with varied dye concentration) with AlexaFluor 488-succinimidyl ester. Two isotypes each of rat, human, and mouse antibodies are tested in duplicate, to cover the most common experimental reagents. The resulting labeling ratio is measured by UV-Vis on a plate reader (on-chip) or nanodrop spectrophotometer (off-chip).

Expected results. Because the device tightly controls the volumes and concentrations of all reagents, and surface adsorption is minimized by the fluorous surfactant, no significant deviation is expected between the on-chip and off-chip reactions according to two-way ANOVA analysis. For individual antibodies, deviation of <10% labeling ratio is considered acceptable. If the device yields a significantly higher or lower labeling ratio, additional surfactants are added to address loss of protein or labeling reagent to surface adsorption (Roach et al., 2005; Pompano et al., 2012).

This EXAMPLE provides a device that uses <10 μg of protein sample to test 5 dye:protein labeling ratios, separates excess dye from the sample, and can be fit into a standard plate reader for analysis. This device allows research groups to rapidly asses labeling ratio of proteins before subsequent validation, and also allows for rapid validation of stored hydrolysable dyes before their use.

Example 6

This EXAMPLE provides scaled fabrication and facilitated slipping, by converting the device from wet-etched glass to 3D printed polymeric substrate. By way of elaboration, an embodiment of the presently disclosed device is prepared using 3D printing by stereolithography, which enables researchers to alternate between prototype development and medium-throughput production (Au et al., 2014; Bhattacharjee et al., 2016; MacDonald et al., 2016; Gross et al., 2017). Stereolithography uses light from a laser or LED to polymerize a liquid precursor solution, or resin, in the desired pattern (Bhattacharjee et al., 2016). This technology has generated a variety of droplet microfluidic devices for analytical chemistry applications (Gross et al., 2017; Shang et al., 2017).

Selection of 3D printer based on resolution and surface smoothness. When printing microfluidic channels and wells, it is the minimum size of the void space that determines the smallest channel size (Gong et al., 2016). Lateral (xy) resolution is set primarily by printer pixel size and resin viscosity (Au et al., 2014; Gong et al., 2015); vertical resolution (z) is set primarily by the optical properties of the resin. A suitable stereolithography printer is the Asiga Pico Plus 27 (Gong et al., 2015; Gong et al., 2016), which prints 300-μm-wide microchannels in commercial resin (PLASClear; Brunet et al., 2017). Custom resins can achieve even smaller channels, 60×108 μm (depth ×width; Gong et al., 2015).

A second printer is the CADworks3D μMicrofluidics Edition M50 (MiiCraft), which offers minimum channel sizes of 30 μm deep×70 μm wide in a transparent resin. In some embodiments of a glass device, the smallest feature is 300×720 μm, well within the printable range. A smooth surface is desirable to allow a small gap height (<20 μm) for slipping and to promote transparency. In preliminary work, the Asiga Pico Plus 27 was tested in comparison with two other 3D printers of similar nominal pixel size (25-30 μm). The Asiga provided sufficient lateral resolution and the smoothest working surface (small ridges every 27 μm). A design comprising a 300-μm post inside a 200-μm wide circular channel (200 μm depth) was printed on three printers: Asiga Pico Plus 27 with PLASclear resin, EnvisionTEC MicroPlus Advantage, and Stratasys Objet500 Connex1. Of these printers, the Asiga provided desirable resolution and desirably smooth surface. Scale bar is 500 μm.

A resin is identified that provides suitable resolution of features (void volume), optical transparency for UV-Vis detection, rigidity and smooth surface, and hydrophobic surface chemistry. The highest resolution resins described previously are not optically clear due to the chromophores used as light absorbers (Gong et al., 2015; Gong et al., 2016). Commercially available resins (PLASclear from Asiga, BV-007 from MiiCraft) that are transparent, rigid, and compatible are tested with the printers selected (Brunet et al., 2017).

Five criteria are evaluated for each resin. Transparency: A 2-mm thick slab is printed, mounted into a UV-Vis plate reader, and measured 5 times from 270 to 700 nm in different xy positions. For an antibody at 1 mg/mL, the expected Abs is −0.05 AU at 300 μm pathlength. Therefore, a 2-mm resin with Abs <0.15 AU for the entire range is accepted and corrected for by using a blank sample on the chip. If needed, the device is printed thinner over the sample reservoirs (200-300 μm of resin) to reduce background absorbance. Surface roughness is measured using a profilometer. Smooth, silanized glass slides is printed off, rather than the rough build plate (Urrios et al., 2016), and if necessary postprocessing is conducted via mild heat or solvent gas treatment to smooth the surface (Rodrigue et al., 2015). Strength and rigidity of the printed device is tested qualitatively. If the resin is too flexible for slipping, the thickness of the printed pieces is increased or a glass backing layer is added.

Surface chemistry. A fluorinated surface is employed for leak-free operation of the device with fluorocarbon oil. Surfaces are fluoro-silanized (Bhattacharjee et al., 2016) and the three-phase contact angle of a water droplet immersed in oil on the surface is measured using a goniometer (Pompano et al., 2012). Resolution is tested by printing an array of channels with widths and depths from 1 mm to 10 μm, with width:depth aspect ratio between 5:1 and 1:5. The smallest features of the chip are designed to match the smallest size achieved with 100% reliability (10/10 trials). Optical transparency and surface roughness of the resin are evaluated, as those qualities are desirable for readability on a UV-Vis and slipping without leakage on a device, whereas the other properties can be worked around or improved by the above methods. If needed, a fully transparent, water-impermeable resin comprising poly(ethylene glycol) diacrylate and colorless Irgacure photoinitiator is tested, whose properties are tunable as described by Urrios et al., 2016.

The device design is refined for 3D printing. Small build size is a common tradeoff for high resolution, and the printers considered can print objects up to 51.8×29×75 mm (xyz, Asiga) and 57×32×120 mm (MiiCraft). In some embodiments, a glass-etched device is 63.5 ×63.5 mm, in 0.7-mm thick glass. To overcome this size mismatch, the xy dimensions of the features is reduced by printing reagent wells at higher aspect ratios than is possible with glass etching. If improved aspect ratios do not shrink the device to the max build size, 2 modules are printed instead. The chip has its functional features in the center, with a 0.5-1 inch unpatterned border for binder clips and finger placement. It is tested whether the border can be printed separately on a low-resolution printer with a larger build area, and then interlocked with the high-resolution center to slip without oil leakage (Malik et al., 2017; Gong et al., 2018). Alternatively, if needed, a truly 3D design is employed to save lateral space by running filling channels above the wells of interest (Bhattacharjee et al., 2016).

The following exemplary features are by 3D printing the device: a) high aspect ratio wells are possible with printing, particular as compared to the lower aspect ratio wells that are provided with glass etching; b) modular printing of a large-build, unpatterned border to lock together with a high-resolution printed device, such as a Type A Machines, Series 1 Pro; c) a proposed pin guide through a track. The pin is inserted at a Position 0 and moved to sequential stop positions 1-5. The direction and distance of each step is programmed into the design to prevent misalignment.

Guided routes are 3D printed for slipping the layers of the device, to avoid fine manual manipulation by the user. In the current planar design, the user has freedom to slip in any xy direction for any distance, but misalignment results in unwanted mixing of reagents. A guide is designed comprising a pin that fits into a track/channel on the opposing layer. A straight pin (i.e. a bump on the top layer) is tested, which would only guide the user but is simple to fabricate, and a T-shaped pin that both guides and "locks" the top layer into the bottom layer with a precise distance between the plates. A T-shaped pin may replace the need for clips to hold the chip together. Pin widths between 200-2000 μm are tested, to identify a size that is strong enough to withstand 10 re-uses of the chip and allows for precise slipping from step to step. The lateral tolerance between pin and track (20-50 μm) that allows easy slipping without misalignment of features is also determined. Narrowed regions of the track require mild pressure to move to the next position, to mark positions for mixing and reactions to occur.

The production of hundreds of polymeric chips is possible by 3D printing, which facilitates provision of a platform for rapid, multiplexed, small-scale optimization of protein derivatization, using a minimal volume of protein, which is compatible with standard UV-VIS detection on a plate reader and requires no more than a pipette and the user's hands to operate. While exemplified here for conjugation of antibodies with fluorophores and chromophores, the device can be operated with smaller proteins by changing the separation modality from size-exclusion to affinity chromatography. Non-optical labels, e.g. a radiolabel, could also be detected by exchanging the plate reader for alternative spatially resolved detectors, e.g. autoradiography (Voytas & Ke, 2001).

Discussion of the Examples

Disclosed herein are devices that can be employed for preparing reactants (e.g., a detectable label and the substance to be detectably labeled), mixing the same in a reservoir where they are allowed to react (e.g., the substance is permitted to be conjugated to the detectable label, in some embodiments several molecules of the detectable label), and then separating one or more of the unreacted substances from the from the reaction products such as by size exclusion chromatography. The particular combination of serial dilution, mixing, and separation disclosed herein can be used, for example, to optimize labelling reactions on chip. In some embodiments, the reagents are diluted, combined in varying ratios, the unreacted label is separated, and the extent of the reaction on the chip is detected for easy optimization. In summary and as disclosed herein, the presently disclosed subject matter relates to accurate dilution of dye on chip, mixing of dye with sample, and removal of dye from sample. In future work these processes will be integrated to provide rapid, small-scale optimization of protein derivatization, and be compatible with UV-VIS detection. It is anticipated that this technology will be widely accepted by the research community, because it is handheld, requires only standard pipets (no pumps needed), reduces the quantity of antibody needed to perform multiple reactions by ~10-fold, and minimizes the time needed to determine the optimal ratio of reagents for protein derivatization.

REFERENCES

All references listed below, as well as all references cited in the instant disclosure, including but not limited to all patents, patent applications and publications thereof, scientific journal articles, and database entries (e.g., GENBANK® database entries and all annotations available therein) are incorporated herein by reference in their entireties to the extent that they supplement, explain, provide a background for, or teach methodology, techniques, and/or compositions employed herein.

Adan et al. (2017) Flow cytometry: basic principles and applications. Crit Rev Biotechnol 37: 163-176.

Arakawa et al. (2007) Protein precipitation and denaturation by dimethyl sulfoxide. Biophys Chem 131:62-70.

Au et al. (2014) Mail-order microfluidics: evaluation of stereolithography for the production of microfluidic devices. Lab Chip 14:1294-1301.

Ballou et al. (2005) Fluorescence imaging of tumors in vivo. Curr Med Chem 12:795-805 (2005).

Bauer (2014) Labeling and use of monoclonal antibodies in immunofluorescence: protocols for cytoskeletal and nuclear antigens. Methods Mol Biol (Clifton, N.J., United States of America) 1131:543-548.

Berlier et al. (2003) Quantitative comparison of long-wavelength Alexa Fluor dyes to Cy dyes: fluorescence of the dyes and their bioconjugates. J Histochem Cytochem Off J Histochem Soc 51:1699-1712.

Bhattacharjee et al. (2016) The upcoming 3D-printing revolution in microfluidics. Lab Chip 16:1720-1742.

Birch et al. (2017) Rapid Fabrication of Electrophoretic Microfluidic Devices from Polyester, Adhesives and Gold Leaf. Micromachines 8:17.

Brunet et al. (2017) Reconfigurable Microfluidic Magnetic Valve Arrays: Towards a Radiotherapy-Compatible Spheroid Culture Platform for the Combinatorial Screening of Cancer Therapies. Sensors (Basel). 17:pii: E2271.

Catterton et al. (2018) User-defined local stimulation of live tissue through a movable microfluidic port. Lab Chip 18:2003-2012.

Chang et al. (2015) Polydimethylsiloxane SlipChip for mammalian cell culture applications. Analyst 140:7355-7365.

Chirica et al. (2006) Size Exclusion Chromatography of Microliter Volumes for On-Line Use in Low-Pressure Microfluidic Systems. Anal Chem 78:5362-5368.

Crosignani et al. (2012) Deep tissue fluorescence imaging and in vivo biological applications. J Biomed Opt 17:116023.

Dawod et al. (2017) Recent advances in protein analysis by capillary and microchip electrophoresis. Analyst 142: 1847-1866.

DeMello (2006) Control and detection of chemical reactions in microfluidic systems. Nature 442:394-402.

Desmet & Baron (2000) The Possibility of Generating High-Speed Shear-Driven Flows and Their Potential Application in Liquid Chromatography. Anal Chem 72:2160-2165.

Dittrich & Manz (2006) Lab-on-a-chip: microfluidics in drug discovery. Nat Rev Drug Discov 5:210-218.

Du et al. (2009) SlipChip. Lab Chip 9:2286-2292.

Easley et al. (2006) A fully integrated microfluidic genetic analysis system with sample-in-answer-out capability. Proc Natl Acad Sci USA 103:19272-19277.

Gong et al. (2015) Optical approach to resin formulation for 3D printed microfluidics. RSC Adv 5:106621-106632.

Gong et al. (2016) High density 3D printed microfluidic valves, pumps, and multiplexers. Lab Chip 16:2450-2458.

Gong et al. (2018) 3D printed high density, reversible, chip-to-chip microfluidic interconnects. Lab Chip 18:639-647.

Gross et al. (2017) Recent Advances in Analytical Chemistry by 3D Printing. Anal Chem 89:57-70.

Gruber et al. (2000) Anomalous fluorescence enhancement of Cy3 and cy3.5 versus anomalous fluorescence loss of Cy5 and Cy7 upon covalent linking to IgG and noncovalent binding to avidin. Bioconjug Chem 11:696-704.

Gu et al. (2005) Preparation and evaluation of poly(polyethylene glycol methyl ether acrylate-co-polyethylene glycol diacrylate) monolith for protein analysis. J Chromatogr A 1079:382-391.

Gump & Monnig (1995) Pre-column derivatization of proteins to enhance detection sensitivity for sodium dodecyl sulfate non-gel sieving capillary electrophoresis. J Chromatogr A 715:167-177.

Gurtovenko & Anwar (2007) Modulating the Structure and Properties of Cell Membranes: The Molecular Mechanism of Action of Dimethyl Sulfoxide. J Phys Chem B 111:10453-10460.

Hagan et al. (2009) Chitosan-Coated Silica as a Solid Phase for RNA Purification in a Microfluidic Device. Anal Chem 81:5249-5256.

Hassan et al. (2015) Droplet Interfaced Parallel and Quantitative Microfluidic-Based Separations. Anal Chem 87:3895-3901.

Haugland (1995) Coupling of Monoclonal Antibodies with Fluorophores. in Monoclonal Antibody Protocols (Humana Press) 205-221.

Hinner & Johnsson (2010) How to obtain labeled proteins and what to do with them. Curr Opin Biotechnol 21:766-776 (2010).

Jackson & Mantsch (1991) Beware of proteins in DMSO. Biochim. Biophys. Acta BBA-Protein Struct Mol Enzymol 1078:231-235.

Janiesch et al. (2015) Key factors for stable retention of fluorophores and labeled biomolecules in droplet-based microfluidics. Anal Chem 87:2063-2067.

Kaminski & Garstecki (2017) Controlled droplet microfluidic systems for multistep chemical and biological assays. Chem Soc Rev 46:6210-6226.

Katikireddy & 0' Sullivan (2011) Immunohistochemical and immunofluorescence procedures for protein analysis. Methods Mol Biol (Clifton, N.J., United States of America) 784:155-167.

Kobayashi et al. (2010) New Strategies for Fluorescent Probe Design in Medical Diagnostic Imaging. Chem Rev 110:2620-2640.

Li & Ismagilov (2010) Protein crystallization using Microfluidic technologies based on valves, droplets, and SlipChip. Annu Rev Biophys. 39:139-158.

Li & Lee (2009) Biocompatible polymeric monoliths for protein and peptide separations. J Sep Sci 32:3369-3378.

Li et al. (2010a) Multiparameter Screening on SlipChip Used for Nanoliter Protein Crystallization Combining Free Interface Diffusion and Microbatch Methods. J Am Chem Soc 132:112-119.

Li et al. (2010b) User-Loaded SlipChip for Equipment-Free Multiplexed Nanoliter-Scale Experiments. J Am Chem Soc 132:106-111.

Liang et al. (2014) Individually addressable arrays of replica microbial cultures enabled by splitting SlipChips Integr Biol 6:796.

Liu et al. (2010) SlipChip for Immunoassays in Nanoliter Volumes. Anal Chem 82:3276-3282.

MacDonald & Wicker (2016) Multiprocess 3D printing for increasing component functionality. Science 353: aaf2093.

Malik et al. (2017) Bio-inspired "jigsaw"-like interlocking sutures: Modeling, optimization, 3D printing and testing. J Mech Phys Solids 102:224-238.

McCormack et al. (1996) Assessment of the Effect of Increased Fluorophore Labelling on the Binding Ability of an Antibody. Anal Lett 29:953-968.

Mochida et al. (2018) Activatable fluorescent probes in fluorescence-guided surgery: Practical considerations. Bioorg Med Chem 26:925-930 (2018).

Nge et al. (2012 Microfluidic chips with reversed-phase monoliths for solid phase extraction and on-chip labeling. J Chromatogr A 1261:129-135.

PCT International Patent Application Publication No. WO 2010/111265

Pompano et al. (2008) Rate of Mixing Controls Rate and Outcome of Autocatalytic Processes: Theory and Microfluidic Experiments with Chemical Reactions and Blood Coagulation. Biophys J 95:1531-1543.

Pompano et al. (2012) Control of Initiation, Rate, and Routing of Spontaneous Capillary-Driven Flow of Liquid Droplets through Microfluidic Channels on SlipChip. Langmuir 28:1931-1941.

Ptaszek (2013) Chapter Three—Rational Design of Fluorophores for In Vivo Applications. in Progress in Molecular Biology and Translational Science (ed. Morris; Academic Press). 113:59-108.

Roach et al. (2005) Controlling nonspecific protein adsorption in a plug-based microfluidic system by controlling interfacial chemistry using fluorous-phase surfactants. Anal Chem 77:785-796.

Rodrigue et al. (2015) 3D soft lithography: A fabrication process for thermocurable polymers. J Mater Process Technol 217:302-309.

Rodriguez-Ruiz et al. (2018) Protein separation under a microfluidic regime. Analyst 143:606-619.

Shang et al. (2017) Emerging Droplet Microfluidics. Chem Rev 117:7964-8040.

Shen et al. (2010) Nanoliter Multiplex PCR Arrays on a SlipChip. Anal Chem 82:4606-4612.

Shen et al. (2011) Multiplexed Quantification of Nucleic Acids with Large Dynamic Range Using Multivolume Digital RT-PCR on a Rotational SlipChip Tested with HIV and Hepatitis C Viral Load. J Am Chem Soc 133: 17705-17712.

Shrestha et al. (2012) Comparative study of the three different fluorophore antibody conjugation strategies. Anal BioanalChem. 404:1449-1463.

Song et al. (2003) Experimental test of scaling of mixing by chaotic advection in droplets moving through microfluidic channels. Appl Phys Lett 83:4664-4666.

Song et al. (2006) Reactions in Droplets in Microfluidic Channels. Angew Chem Int Ed 45:7336-7356.

Spicer & Davis (2014) Selective chemical protein modification. Nat Commun 5:4740.

Stephanopoulos & Francis (2011) Choosing an effective protein bioconjugation strategy. Nat Chem Biol 7:876-884.

Szabó et al. (2018) The Effect of Fluorophore Conjugation on Antibody Affinity and the Photophysical Properties of Dyes. Biophys J 114:688-700.

Tetala & Vijayalakshmi (2016) A review on recent developments for biomolecule separation at analytical scale using microfluidic devices. Anal Chim Acta 906:7-21.

Tsuchikama & An (2018) Antibody-drug conjugates: recent advances in conjugation and linker chemistries. Protein Cell 9:33-46.

U.S. Pat. Nos. 9,415,392; 9,447,461; 9,464,319; 9,493,826; 10,196,700.

Urrios et al. (2016) 3D-Printing of Transparent Bio-Microfluidic Devices in PEG-DA. Lab Chip 16:2287-2294.

Vira et al. (2010) Fluorescent-labeled antibodies: Balancing functionality and degree of labeling. Anal Biochem 402: 146-150.

Voytas & Ke (2001) Detection and Quantitation of Radiolabeled Proteins in Gels and Blots. Curr Protoc Cell Biol 10:6.3.1-6.3.10.

Wang et al. (2012) Rapid protein concentration, efficient fluorescence labeling and purification on a micro/nanofluidics chip. Lab Chip 12:2664-2671.

Wen et al. (2007a) Microfluidic-Based DNA Purification in a Two-Stage, Dual-Phase Microchip Containing a Reversed-Phase and a Photopolymerized Monolith. Anal Chem 79:6135-6142.

Wen et al. (2007b) Microfluidic chip-based protein capture from human whole blood using octadecyl (C18) silica beads for nucleic acid analysis from large volume samples. J Chromatogr A 1171:29-36.

Wenz et al. (2010) A fluorescent derivatization method of proteins for the detection of low-level impurities by microchip capillary gel electrophoresis. Electrophoresis 31:611-617.

Yang et al. (2015) On chip preconcentration and fluorescence labeling of model proteins by use of monolithic columns: device fabrication, optimization, and automation. Anal Bioanal Chem 407:737-747.

Yu et al. (2009) Polymer microchip capillary electrophoresis of proteins either off- or on-chip labeled with chameleon dye for simplified analysis. Electrophoresis 30:4230-4236.

Zhao et al. (2013) Droplet-based in situ compartmentalization of chemically separated components after isoelectric focusing in a Slipchip. Lab Chip 14:555-561.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A device for carrying out a reaction, the device comprising:

a first part having a first surface and a second part having a second surface opposed to the first surface;

a plurality of first reservoirs located along a portion of the first surface, each of the plurality of first reservoirs configured to maintain at least one first substance;

a plurality of second reservoirs located along a portion of the second surface, each of the plurality of second reservoirs configured to maintain at least one second substance;

a plurality of third reservoirs located along a portion of the second surface, each of the plurality of third reservoirs configured to maintain at least one third substance; and a plurality of fourth reservoirs located along a portion of the first surface, each of the plurality of fourth reservoirs configured to maintain at least one fourth substance, optionally wherein one or more, further optionally each of the one or more, of the plurality of fourth reservoirs is separated into two, three, four, five, six, or more sub-reservoirs;

wherein the first surface and the second surface are configured to move relative to each other between:

a first position in which the plurality of first, second, third, and fourth reservoirs are not exposed to any of the other first, second, third, or fourth reservoirs;

a second position in which at least one of the plurality of first reservoirs is exposed to at least one of the plurality of the second reservoirs and none of the third or fourth reservoirs;

a third position in which at least one of the plurality of first reservoirs is exposed to at least one of the plurality of the third reservoirs and none of the second or fourth reservoirs;

a fourth position in which at least one of the plurality of fourth reservoirs is exposed to at least one of the plurality of the second or third reservoirs; and a fifth position in which the at least one of the third reservoirs is positioned with respect to a detection device such that the detection device can pass a detection light beam through the at least one third reservoir in order to assay the contents of the at least one third reservoir, and wherein the first part and the second part are engaged with each other before and after the relative motion.

2. The device of claim 1, wherein the plurality of first reservoirs are configured to maintain the same volume of the at least one first substance as each other.

3. The device of claim 1, wherein the plurality of second reservoirs are configured to maintain different volumes of the at least one second substance as each other.

4. The device of claim 1, wherein the plurality of third reservoirs are configured to maintain the same volume of the at least one third substance as each other.

5. The device of claim 1, wherein the plurality of first reservoirs are configured to maintain different volumes of the at least one first substance as each other, the plurality of second reservoirs are configured to maintain different volumes of the at least one second substance as each other, the plurality of third reservoirs are configured to maintain different volumes of the at least one third substance as each other, or any combination thereof.

6. The device of claim 1, wherein each of the plurality of fourth reservoirs are configured to maintain a volume of the at least one fourth substance that is at least as large as the volume of the at least one third substance maintained by each of the plurality of the third reservoirs, and optionally wherein the volume of the at least one fourth substance maintained by each of the plurality of fourth reservoirs is two, three, four, five, or greater than five times that maintained by each of the plurality of the third reservoirs.

7. The device of claim 1, wherein the plurality of first reservoirs are in fluid communication with each other and with one, optionally more than one, first fluid inlet such that each of the plurality of first reservoirs can be filled with the at least one first substance by introducing a sufficient volume of the at least one first substance into the first fluid inlets or inlets.

8. The device of claim 1, wherein the plurality of second reservoirs are in fluid communication with each other and with one, optionally more than one, second fluid inlet such that each of the plurality of second reservoirs can be filled with the at least one second substance by introducing a sufficient volume of the at least one second substance into the second fluid inlets or inlets.

9. The device of claim 1, wherein the plurality of third reservoirs are in fluid communication with each other and with one, optionally more than one, third fluid inlet such that each of the plurality of third reservoirs can be filled with the at least one third substance by introducing a sufficient volume of the at least one third substance into the third fluid inlets or inlets.

10. The device of claim 1, wherein the at least one fourth substance comprises a separation medium, optionally a size exclusion matrix.

11. The device of claim 1, wherein the device has overall dimensions of a standard 96, 384, 1024, or 1536 well multiwell plate and individual reservoirs of each of the pluralities of first, second, third, and fourth reservoirs are located in positions that correspond to column locations of the standard 96, 384, 1024, or 1536 well multiwell plate and/or wherein the device is configured for placement in an adaptor that itself has overall dimensions of a standard 96, 384, 1024, or 1536 well multiwell plate, wherein the adaptor orients the device such that individual reservoirs of each of the pluralities of first, second, third, and fourth reservoirs are located in positions that correspond to column locations of the standard 96, 384, 1024, or 1536 well multiwell plate.

12. The device of claim 1, wherein the first and second surfaces are glass and the plurality of first, second, third, and fourth reservoirs are wet-etched into the first and second surfaces.

13. The device of claim 1, wherein the first and second surfaces are produced by a method selected from the group consisting of three-dimensional (3D) printing, hot embossing, injection molding in a thermoplastic material, and machining, or a combination thereof.

14. The device of claim 1, wherein the device further comprises one or more additional pluralities of reservoirs.

15. The device of claim 1, wherein the device further comprises a barrier between the first and second surfaces, optionally a thin layer of water-immiscible oil, located such that unintended fluid transfer does not occur in any gap between the first and second surfaces.

16. The device of claim 15, wherein the barrier also functions to lubricate the first and second surfaces as they are moved relative to one another.

17. The device of claim 1, wherein the device further comprises a detection window that is substantially transparent to light in the ultraviolet (UV)/visible spectrum, optionally wherein the device itself is substantially transparent to light in the ultraviolet (UV)/visible spectrum.

18. The device of claim 1, wherein the fourth reservoirs comprise at least 4, 5, 6, or more sub-reservoirs.

19. The device of claim 1, wherein the fourth reservoirs maintain at least enough of the at least one fourth substance to provide at least 95%, 96%, 97%, 98%, or 99% removal of the unreacted first substance from the third reservoirs.

20. A method for optimizing conjugation of a ligand with a detectable agent, the method comprising:

(a) introducing into each member of the plurality of first reservoirs of the device of claim 1 an amount of the detectable agent;

(b) introducing into each member of the plurality of second reservoirs of the device a volume of a dilution buffer;

(c) introducing into each member of the plurality of third reservoirs of the device an amount of the ligand;

(d) moving the first and second surfaces of the device relative to each other such that individual members of the plurality of first reservoirs come into a first fluid communication with individual members of the plurality of second reservoirs and maintaining the first fluid communication for a time sufficient for the contents of the first and second reservoirs to create a plurality of homogenous solutions;

(e) subsequent to step (d), moving the first and second surfaces of the device relative to each other such that individual members of the plurality of first reservoirs come into a second fluid communication with individual members of the plurality of third reservoirs and maintaining the second fluid communication for a time sufficient for the detectable agent and the ligand to conjugate;

(f) subsequent to step (e), moving the first and second surfaces of the device relative to each other such that individual members of the plurality of fourth reservoirs come into a third fluid communication with individual members of the plurality of third reservoirs and maintaining the third fluid communication for a time sufficient for any unreacted detectable agent to diffuse out of the third reservoir;

(g) subsequent to step (f), moving the first and second surfaces of the device relative to each other such that all fluid communication among the third reservoirs and the first, second, and fourth reservoirs is extinguished;

(h) detecting the degree to which the detectable agent conjugated to the ligand in each of the plurality of third reservoirs; and determining which of the plurality of the third reservoirs contained an optimal degree of conjugation of the detectable agent to the ligand.

* * * * *